(12) United States Patent
Frohlich et al.

(10) Patent No.: US 8,363,058 B2
(45) Date of Patent: Jan. 29, 2013

(54) PRODUCING VIDEO AND AUDIO-PHOTOS FROM A STATIC DIGITAL IMAGE

(75) Inventors: David Mark Frohlich, Bristol (GB);
David Arthur Grosvenor, Bristol (GB);
Glenn Peter Hall, Stroud (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 3299 days.

(21) Appl. No.: 10/833,531

(22) Filed: Apr. 28, 2004

(65) Prior Publication Data

US 2005/0008343 A1  Jan. 13, 2005

(30) Foreign Application Priority Data

Apr. 30, 2003 (GB) .................................. 0309961.1

(51) Int. Cl.
*G06T 13/00* (2011.01)
(52) U.S. Cl. ..................... 345/475; 345/473; 345/474
(58) Field of Classification Search .................. None
See application file for complete search history.

(56) References Cited

U.S. PATENT DOCUMENTS

| | | | | |
|---|---|---|---|---|
| 5,926,190 A | * | 7/1999 | Turkowski et al. | 345/473 |
| 6,362,850 B1 | | 3/2002 | Alsing et al. | |
| 6,636,238 B1 | * | 10/2003 | Amir et al. | 715/730 |
| 7,134,080 B2 | * | 11/2006 | Kjeldsen et al. | 715/730 |
| 2006/0215924 A1 | * | 9/2006 | Steinberg et al. | 382/254 |

FOREIGN PATENT DOCUMENTS

| | | |
|---|---|---|
| EP | 0 435 700 A2 | 7/1991 |
| EP | 0610863 A1 | 8/1994 |
| EP | 0 651 556 A2 | 5/1995 |
| EP | 1235182 A2 | 8/2002 |
| GB | 2378073 A | 7/2001 |
| GB | 2372658 A | 8/2002 |
| WO | WO 97/31482 | 8/1997 |
| WO | WO 00/08853 | 2/2000 |
| WO | WO 02/05835 | 1/2002 |
| WO | WO 02/052835 | * 7/2002 |

OTHER PUBLICATIONS

The Patent Office, Search Report Under Section 17, Sep. 16, 2003.

* cited by examiner

*Primary Examiner* — Daniel Hajnik

(57) ABSTRACT

Systems and methods of producing video data and/or audio-photos from a static digital image are disclosed. One such method, among others, comprises receiving input from a user indicating sequentially, in real time, a plurality of regions of the static digital image. The method also includes processing the user input to determine the visual content of each of a sequence of video frames and generating output data representative of the sequence of video frames. The sequence and composition of the video frames are determined such that the visual content of the video frames is taken from the static digital image. For each region of the static image indicated by the user, a video frame is composed such that the said region occupies a substantial part of the video frame. The sequence of video frames shows the regions indicated by the user in sequential correspondence with the sequence in which the user indicated the regions and substantially in pace with the time in which the user indicated the regions.

30 Claims, 5 Drawing Sheets

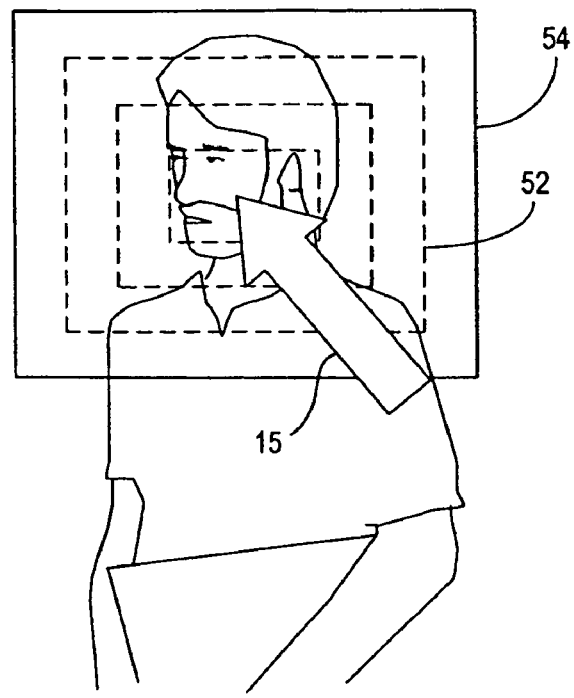
FIG. 4
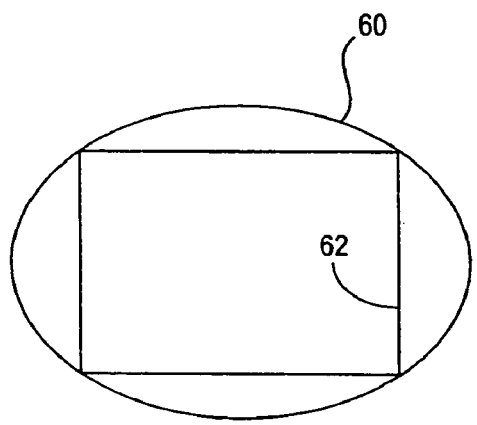 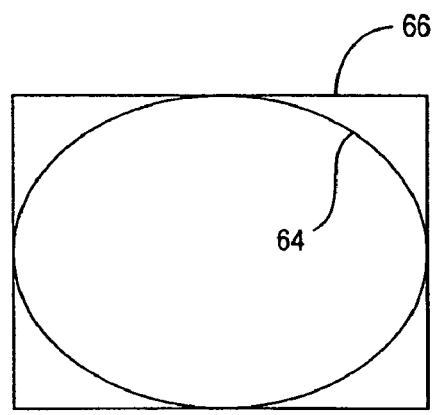
FIG. 5A    FIG. 5B

PRODUCING VIDEO AND AUDIO-PHOTOS FROM A STATIC DIGITAL IMAGE

CROSS-REFERENCE TO RELATED APPLICATION

This application claims the benefit of foreign priority under 35 U.S.C. 119 to patent application number GB 0309961.1, filed Apr. 30, 2003, which is entirely incorporated herein by reference.

FIELD OF THE INVENTION

The present application relates in general to processing a static digital image, and more particularly relates to producing moving video images and/or audio-photos from a static digital image.

BACKGROUND

Static digital images can readily be obtained, for example, using a digital camera or a scanner. Other static images may be computer-generated or downloaded from pre-existing image databases. Static digital images may be displayed using a digital display device such as a computer monitor, digital projector, or the like, and are typically shown either individually or as part of a computerized "slide-show" presentation (e.g. using Microsoft™ PowerPoint™).

However, with static images, often it is only possible to retain the viewer's interest and attention for a very limited period of time. Moving video is often considered to be more effective at holding the viewer's attention.

With conventional (i.e. non-digital) static images, the television and film industries developed rostrum camera techniques to enable moving video to be generated from static images such as photographs or paintings, thereby enhancing the viewer's interest in the image. Rostrum camera techniques are well established, and typically involve moving the camera relative to the static image to give a panning effect, zooming the camera in to features of interest, and zooming out to reveal a wider field of view.

Generating moving video from a static digital image using virtual rostrum camera techniques is also possible. These techniques enable the viewer to be taken on a visual tour around regions of interest in the image. WO 00/08853 describes an example of such a technique, in which the user manually specifies the positions of key frames over the image, and then the computer automatically generates a path of panning between the key frames at a fixed rate. Alternatively, the user can manually generate the path of panning between the key frames at a controlled rate.

A related example of a technique for generating video from a static digital image is given in WO 97/31482. Here, the user of a spherical image file can specify panning movements over the image to generate a default video tour of the image, or can interrupt the tour to specify his own angle of view and travel using on-screen control icons.

The panning of a virtual rostrum camera across a static digital image can be automated by computer, as described in GB 2372658 A. Here, an image processing system is employed to locate regions of visual interest (e.g. people's faces) in the image and to generate an automated rostrum camera movement between them. The image processing system designates a region as being of visual interest if its visual characteristics satisfy predetermined rules. The regions of interest so extracted then become route destinations in the video tour of the image, which is further constrained by pre-determined aesthetic rules governing the sequence of panning and zooming, and preset times for dwelling on the regions and for covering each image if a set of images is used.

Neither the manual nor automated methods are entirely satisfactory from the user's point of view. Manual methods for specifying panning and zooming operations are time-consuming and are likely to be too complex for consumer applications where they might have most benefit. Automatic methods, on the other hand, only find regions of visual interest in an image which satisfy the predetermined rules, and these may not correspond to regions of psychological interest, such as those features which would be noteworthy in a story about the image.

Accordingly, there is a need for a method for generating video from a static image which is intuitive and easy to use, and which enables the video content to correspond to the features that would be pointed out by someone verbally telling a story about the image or explaining the features therein.

SUMMARY

According to a first aspect of the present application, there is provided a method of producing video data from a static digital image. The method comprises receiving input from a user indicating sequentially, in real time, a plurality of regions in the static image. The method also includes processing the user input to determine the visual content of each of a sequence of video frames and generating output data representative of the sequence of video frames. The sequence and composition of the video frames are determined such that the visual content of the video frames is taken from the static digital image. For each region of the static image indicated by the user, a video frame is composed such that the region occupies a substantial part of the video frame. The sequence of video frames shows the regions indicated by the user in sequential correspondence with the sequence in which the user indicated the regions and substantially in pace with the time in which the user indicated the regions.

According to another aspect of the present application, there is provided a video processing device comprising means for receiving input from a user indicating sequentially, in real time, a plurality of regions in a static image. The video processing device also comprises means for determining the visual content of each of a sequence of video frames in accordance with the user input and for capturing the temporal relationship between the regions as indicated by the user. The video processing device further comprises means for generating output data representative of the sequence of video frames. The sequence and composition of the video frames are determined such that: the visual content of the video frames is taken from the static digital image. For a region of the static image indicated by the user, a video frame is composed such that the said region occupies a substantial part of the video frame. Also, the sequence of video frames shows the regions indicated by the user in sequential correspondence, and substantially temporal correspondence, with the sequence of regions indicated by the user.

According to another aspect of the present application, there is provided a method of creating a digital image having accompanying audio. The method comprises receiving input from a user indicating a region in a first digital image; receiving audio from the user; cropping the first image to the region indicated by the user, thereby creating a second image comprising the indicated region from the first image; and associating the audio with the second image.

According to another aspect of the present application, there is provided a computer program operable to create a digital image having accompanying audio by controlling a processor to execute a method. The method comprises receiving input from a user indicating a region in a first digital image and receiving audio from the user. The method also comprises cropping the first image to the region indicated by the user, thereby creating a second image comprising the indicated region from the first image, and associating the audio with the second image.

According to yet another aspect of the present application, there is provided an image processing device comprising means for receiving input from a user indicating a region in a first digital image and means for receiving audio from the user. the image processing device also comprises means for cropping the first image to the region indicated by the user, thereby creating a second image comprising the indicated region from the first image, and for associating the audio with the second image.

BRIEF DESCRIPTION OF THE DRAWINGS

Embodiments of the present application will now be described, by way of example, and with reference to the following drawings in which:

FIG. 4 illustrates a portion of the static digital image of FIG. 1 and an example of an operation for selecting a video frame region from a single point;

FIG. 5a illustrates an example of an ellipse drawn by a user and an example of a corresponding rectangular video frame derived within the ellipse;

FIG. 5b illustrates another example of an ellipse drawn by a user and an example of a corresponding rectangular video frame derived to include the ellipse.

DETAILED DESCRIPTION OF THE PREFERRED EMBODIMENTS

Figure 1:
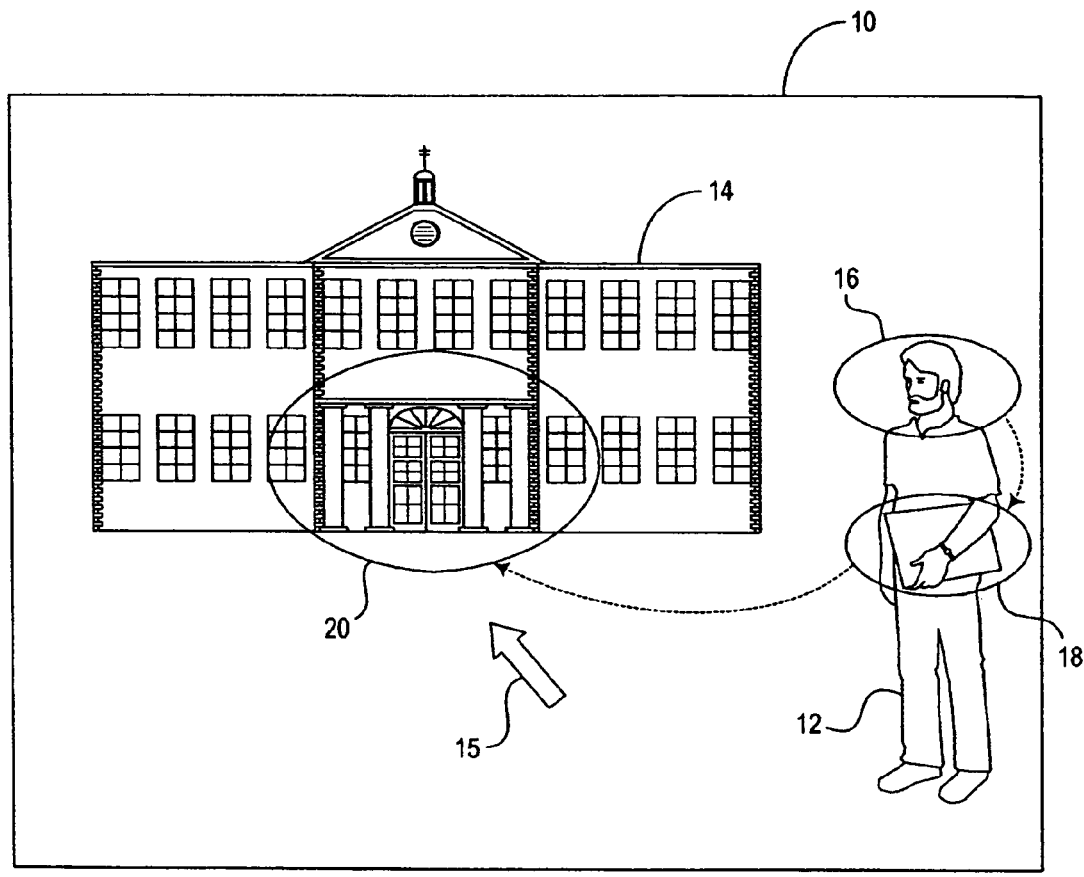
FIG. 1 illustrates an example of a static digital image on which three regions have been indicated in ellipses by a user.

The present application is directed to methods and systems for producing moving video and/or audio-photos from a single static digital image.

According to a first aspect of the present application, methods and systems are provided for producing video data from a static digital image, in which input from a user is received, the input indicating sequentially, in real time, a plurality of regions in the static image. The user input is processed to determine the visual content of each of a sequence of video frames and generating output data representative of the sequence of video frames. The sequence and composition of the video frames are determined such that the visual content of the video frames is taken from the static digital image. For each region of the static image indicated by the user, a video frame is composed such that the region occupies a substantial part of the video frame. The sequence of video frames shows the regions indicated by the user in sequential correspondence with the sequence in which the user indicated the regions and substantially in pace with the time in which the user indicated the regions.

Receiving the user input in real time advantageously enables the user to indicate regions of the static image while telling a story about the image or discussing the features therein. Hence, the natural behavior of a person talking about a picture (or a set of pictures) can be used to derive a video tour around the features of the image indicated by the person. The regions of interest may intuitively be indicated by the user while talking about the image (e.g. by pointing). Because they are indicated by the user, any regions (particularly those of psychological interest) can be featured in the video, not just the regions of visual interest as would only be extracted by an automatic method. Likewise, the order in which the regions are to be visited in the video, and the time to dwell on each region in the video, can also be indicated intuitively by the user's natural story-telling behavior. A further advantage is that the resulting video is generated in pace with the timing of the user's narration, which enables (if desired) the user's narration to serve as a soundtrack to accompany the video.

Coupling the production of video with narration on features of interest in the static image provides mutual benefits. The interest of a video tour around the image for the viewer or audience may be increased by incorporating narrative information about the image, and the visual content of the video tour may be specified more naturally and easily as a result of talking about the features of the image.

According to a second aspect of the present application, methods and systems are provided for creating an audio-photo from a single static digital image, the audio-photo having identified regions of the digital image and accompanying audio. Input is received from a user indicating a first region in the digital image. Audio is also received from the user. The digital image is cropped to the region indicated by the user, thereby creating a second image comprising the indicated region from the first image. The audio is then associated with the second image.

The embodiments of the present application described herein may be implemented in software, hardware, or a combination thereof. When implemented in software as a computer program or other ordered listing of executable logical instructions, the software may be executed by a processor or other device suitable for executing software instructions. The processor, for example, may be part of a personal computer or other suitable digital computing device or as part of a video or image processing device, for example. In addition, the embodiments described herein may be implemented as a computer program stored on a medium having a format adapted for readability by a processor or processor-based system.

Producing Video from Static Digital Images

Embodiments for creating video from a static digital image will now be described, the resulting video being generally similar to that which is used in a movie or television documentary when a narrator discusses a static image (e.g. a painting) and a camera operator moves a rostrum camera to particular parts of the image, in time with the narration. However, although embodiments of the present application may be used in the television and film industries, they are presently intended more for domestic and personal use, for use with personal photographs, and exploit the fact that people have a natural tendency to point to areas of a photograph when talking about them.

FIG. 1 illustrates an example of a static, or still, digital image 10, shown here as a photograph featuring a person 12 standing near a building 14. The static digital image may be displayed, for instance, on a visual display unit of an image processing device, for example but not limited to a personal computer (PC), a personal digital assistant (PDA), or other device having appropriate data processing capability.

Regions of the static digital image can be indicated by a user's input using one of several different possible input devices in a manner in accordance with one of several different possible techniques. For example, a cursor 15 may also be displayed on the visual display unit and moved around the image by a user manipulating a cursor control device, for example but not limited to a mouse or trackball. Alternatively, a touch sensitive display panel may be used, or a printed version of the image may be placed on a digitizing tablet. These, and other possible ways for receiving input from a user, will be described in more detail later.

To create video motion from the static image 10, the user indicates a sequence of a plurality of regions, such as regions 16, 18 and 20, using the cursor control device. These regions may be indicated by the user while verbally discussing the content of the image. In this case, the regions are indicated by the user tracing circles or ellipses around the regions using the cursor control device, although other methods for indicating regions are possible and will also be discussed later.

A processor then determines a sequence of video frames corresponding to the regions indicated by the user, using image data from the static image. The video frames are determined such that, for each region indicated by the user, a video frame is composed such that the selected region occupies a substantial part of the video frame. Different methods by which the processor may determine the size and position of the video frame with respect to the overall static image will be discussed below. The overall structure of the video sequence is such that the regions indicated by the user are featured in the same order as indicated by the user, and such that the time period between subsequently featured regions corresponds with the timing pattern in which the user indicated the regions. In other words, the video sequence provides a reproduction in real time of the sequence in which the user indicated the regions.

The number of video frames that are generated will depend on the quality of the video motion that is required. In a computationally simple embodiment, video frames are generated corresponding to each region indicated by the user, and each frame is maintained in view for the required duration corresponding to the interval between the user indicating one region and the next. When viewed, the video comprises a sequence of modified still images, cutting between the regions indicated by the user.

In a more sophisticated and preferred embodiment, sufficient video frames are generated to give the impression of motion between the indicated regions. A greater number of frames improves the fluidity of the video motion. The indicated regions are used to generate key video frames, defined as those video frames which directly correspond to an indicated region. To give the illusion of video movement (i.e. panning and/or zooming) between the indicated regions, the processor also generates intermediate frames that are filled in between the key video frames during the time periods between the indication of the key video frames. The visual content of the intermediate frames is taken from the static image between the positions of the key video frames. A panning effect is obtained by generating intermediate frames between two key video frames from different locations on the static image.

The indicated regions may be a variety of sizes, and the key video frames can take their visual content from larger or smaller areas of the static image as appropriate. A zooming effect is created by generating intermediate frames between key video frames which cover unequal areas of the static image. If the static image is of a higher resolution than the video frames, zooming into regions of the image may be achieved without any loss of picture quality.

Figure 2A:
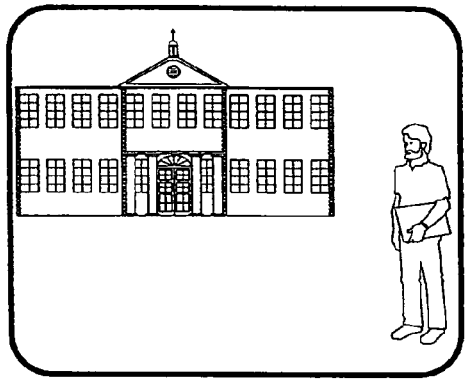
FIGS. 2a to 2f illustrate examples of video frames derived from the static digital image of FIG. 1.
Figure 2B:
Figure 2C:
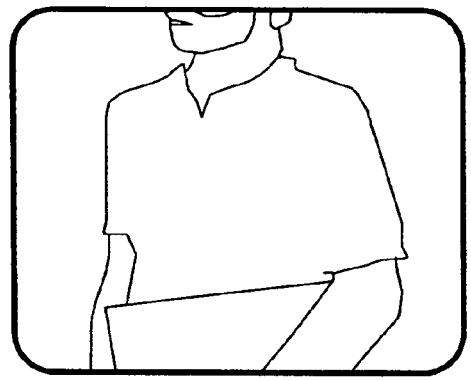
Figure 2D:
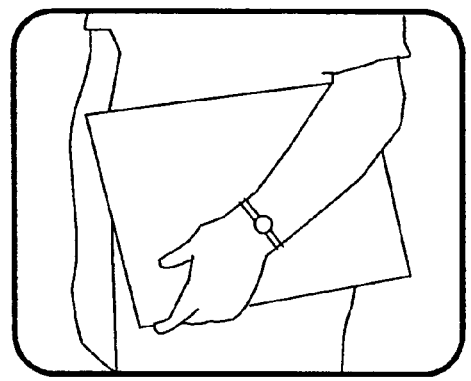
Figure 2E:
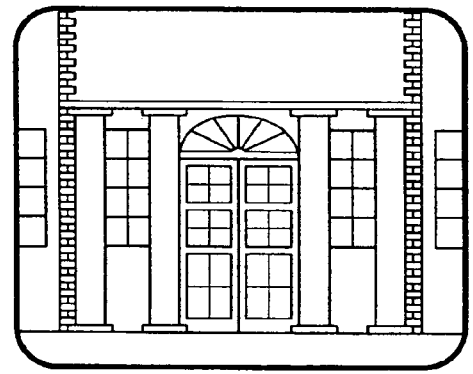
Figure 2F:
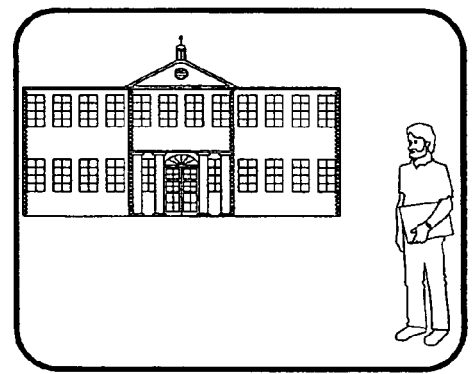

FIGS. 2a to 2f illustrate some of the video frames that may be derived from the static image shown in FIG. 1, the video frames having been determined in correspondence with the sequence of regions 16, 18 and 20 indicated by the user. The video may begin with an overview of the whole image (FIG. 2a), corresponding to the period of time before the user first indicates region 16. Then, corresponding to the point in time at which the user indicates region 16, the key video frame of FIG. 2b is generated, effectively zooming in to the region 16. Some intermediate video frames may be generated before arriving at FIG. 2b, to give a smooth zoom in to this detail. The frame of FIG. 2b is then maintained until a little before or up to the point at which the user indicates region 18. This region is used to generate the key frame of FIG. 2d, but rather than cutting directly to this region, some intermediate frames are generated (one of which is shown in FIG. 2c) to give the effect of panning from FIG. 2b to 2d. These intermediate frames may be generated between the timing indication of the regions 16 and 18 such that the moving video arrives at the key video frame of FIG. 2d at or a little after the point at which region 18 is indicated. The key frame shown in FIG. 2e is created in correspondence with the user indicating region 20, and again a number of intermediate frames may be generated to give the effect of panning across the scene. A possible ending of the video is shown in FIG. 2f, being another overview image. A series of intermediate frames may be generated to zoom out from the frame of FIG. 2e. Thus, a video tour around the static image has been created.

Figure 3:
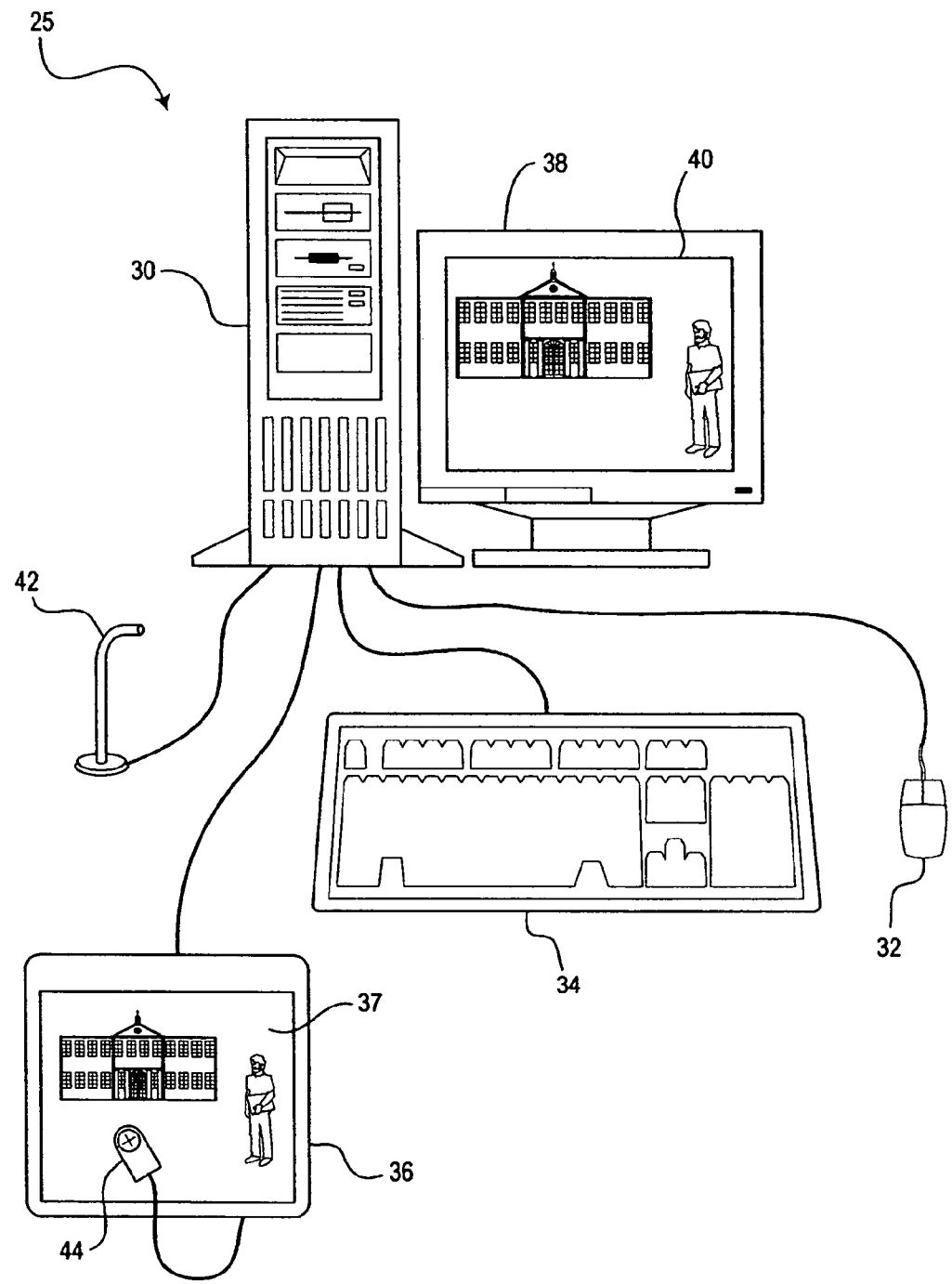
FIG. 3 illustrates an embodiment of a system for composing a moving video and/or audio-photos from a static digital image.

As shown in FIG. 3, an embodiment of a system 25 for generating moving video from a static digital image is illustrated. The system 25 may implement the above-mentioned methods of video generation from static digital images. The system 25 comprises a multimedia computer 30, or other suitable processing system, with at least one user input device, for example but not limited to a mouse 32, a keyboard 34, and a digitizing tablet 36. The static image 40 may be displayed on a conventional monitor 38 and the cursor 15 (FIG. 1) is manipulated using the mouse 32 to indicate regions of interest. The digitizing tablet 36 also provides an intuitive input technique, whereby a printed copy of the static image 37 is placed on the tablet and regions are indicated by a user using a stylus 44 or equivalent pointing device. Alternatively, a touch screen device (not shown) may be used, on which the static image is displayed electronically and which is responsive to user touch, e.g. using a stylus, hand, or finger. A PDA or a pen-based tablet computer may also be used for this purpose.

In use, a user input device is operated to indicate regions of interest in the static image to feature in the video, and this may be done while verbally discussing the content of the image.

The user's verbal narration of the content of the image may also be recorded, effectively as verbal annotation for the digital image. To enable this, the computer 30 may be equipped with a microphone 42. The microphone 42 may be integral with an image processing device of the computer 30. In use, the user presses a record button (e.g. a key on the computer keyboard) to record a narration of the digital image. During discussion of the image, the user indicates regions of the image using a user input device, e.g. by pointing with the mouse cursor or stylus on a tablet. These indications, together with the time profile of their occurrence, are processed to generate the video, with the video effects of panning, zooming and cutting being effected as appropriate.

The term "narrative input" used herein should be interpreted broadly to include any detectable behavior from the user which accompanies or supports the narration of the features of the static image (or an explanatory discussion thereof). Narrative input includes, but need not be limited to, speaking, pointing, and gesturing, in any manner which may be detected and processed.

The video may be generated in real time with the user's pointing indications, or alternatively the user's indications may be recorded and the video generated subsequently. The user may make his indications deliberately using an input device or alternatively, a sensor and/or processing device may be used to pick up a user's speech and/or body language and to analyze this information to obtain implied indications of regions of the static image.

Other methods of receiving input from a user to indicate regions of interest are possible. These include receiving the user's speech via the microphone, processing the speech to identify key words or phrases (such as "man", "house" etc.), and then employing a visual feature recognition algorithm to locate the corresponding features in the image. Another alternative is to arrange a digital camera directed at the image (be it electronically displayed or printed) and to capture and process the user's gestures relative to the image, creating data corresponding to the user's indications of regions within the image. The technique of mounting a digital camera to detect hand motions relative to an image is described in UK Patent Application Nos. 0118434.0 and 0213531.7. These techniques could be used for generating video in response to the discussion of an image between two people, capturing gestural, speech and timing information from spontaneous conversation arising around an image. Speaker changes, cue phrases, pauses and interactions with the image could all be captured to provide further input indicating regions of interest in the image.

If the user's verbal narration is recorded along with his pointing indications of the features of the image, then the narration may be incorporated in the resulting video as a soundtrack.

A recorded verbal narration may also be associated with the static image as a series of region-specific audio annotations. Since the user's pointing indications are detected while the narration is made, a processor, such as one embedded in the computer 30, for example, can associate each piece of narration with the corresponding region of the static image. A possible playback system could involve displaying the static digital image and enabling a user to click on regions of interest within the image, upon which the audio annotation would be played. The processor could apply video effects such as zooming in to that region.

When receiving user input via a mouse, stylus or equivalent pointing device indicating a region of interest in a static image, an image processing means of the computer 30 may employ various techniques to determine the visual content of the corresponding key video frame. Three possibilities are shown in FIGS. 4, 5a and 5b. FIG. 4 shows a part of a static image as may be displayed on a display device (e.g. the monitor 38). Here, the user has clicked on the face of the man using the cursor 15, to indicate that the face is a region of interest. To determine the extent of the region around the point of the cursor to be included in the corresponding key video frame, the processor or image processing means employs a seeding and automated cropping algorithm, similar to that described in WO 02/052835. The seeding process involves starting from the position indicated by the point of the cursor and effectively plotting a series of concentric frames (as indicated by the broken rectangles e.g. 52) until a frame (e.g. 54) is obtained having visual content which conforms to predetermined rules. The rules may, for example, characterize the visual features of a human head, and hence the frame 54 is determined such that all the head is included. Other rules might characterize the region of interest as being a "coherent colorful blob" or background framing images around the position indicated by the cursor.

Further methods are indicated in FIGS. 5a and 5b. In both these cases, an ellipse (60, 64) has been plotted on the static image by the user to indicate a region of interest. The shape need not be an ellipse, and could be a circle, or another regular or irregular shape, or simply a rough freehand indication around the region of interest. It is not envisaged that the plotted shape will be displayed on the static image (although this could be done), but instead the shape is merely traced to indicate the general extent of the region of interest. As indicated in FIG. 5a, the processor or image processing means may determine the extent of the corresponding video frame 62 such that it lies within the ellipse 60 (including as much of the static image within the ellipse as possible). Alternatively, as shown in FIG. 5b, the video frame 66 may be determined such that it includes all (or substantially all) of the ellipse 64.

Various rules could be used by the system 25 to determine which video movements to apply for any pointing movement. For example, a simple touch to a location (or mouse click-and-hold-down at a cursor location) might correspond to a smooth zoom-in operation to a region around the selected point. The region might be indicated by a circling movement, as described above. Zooming might be tied to a pause in the talk, which often follows a pointing movement. Removal of the finger (or release of the mouse button) might result in a cut back to the whole image view, or a smooth zoom out. Alternatively, the zoom-in might be sustained following removal of the finger until a second pointing action is made to control a pan to the next location. The precise nature of these rules could be specified in user preferences in the control software, or by empirical study. The user's indications would effectively comprise a gestural control language for the system 25 and, as discussed above, the resulting video movements would be rendered at a pace determined by the timing of the original pointing movements, to enable the video movements to remain synchronized with concurrent verbal narration.

The processor may use virtual rostrum camera effects and video sequences generated over more than one static image. This would enable a smooth panning or zooming effect to be achieved across a plurality of images laid out alongside one another, e.g. on the same album page. This effect could also be applied to photographs of adjoining scenes—for example, to pan and zoom across a panoramic view of a wide mountain range captured in a sequence of static images. When processing more than one static image, the processor may also use fade-in and fade-out effects.

Figure 6:
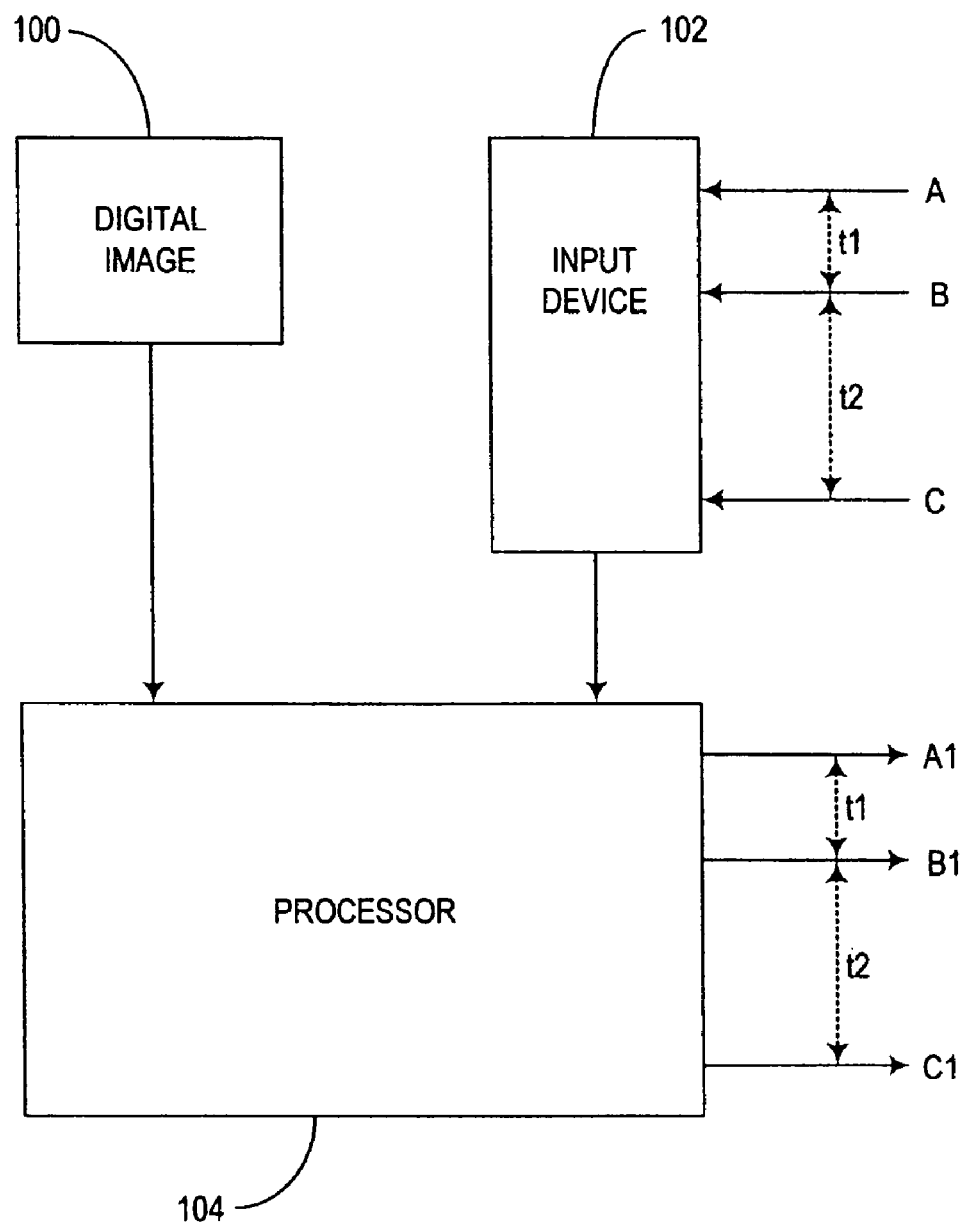
FIG. 6 illustrates an example of a sequence of user input events and corresponding video frame outputs.

With reference to FIG. 6, a diagrammatic view is shown illustrating an example of a timing sequence of input events and the corresponding video frame outputs. A processor 104, such as one that may be embedded in computer 30, is communicatively coupled to an input device 102 operable to receive user input. The processor 104 also receives a digital image 100 from an arbitrary source. The input device 102 is configured to receive user input specifying regions of the image (A, B, C) and to convey this input in real time to the processor 104. In the example shown in this figure, three incidents of user input (A, B, C) are depicted. Since the processor receives this input in real time, it can readily determine the temporal relationship between the incidents of user input. In the figure, the time interval between the user indicating the first region of the image (A) and the second (B) is indicated by t1, and the interval between the second region (B) and the third (C) is indicated by t2.

The processor 104 processes the user input to derive a sequence of key video frames (A1, B1, C1) corresponding to the three regions (A, B, C) of the static image as indicated by the user. For example, frame A1 is composed such that region A occupies a substantial part of the video frame. Data representative of these video frames (A1, B1, C1) is outputted from the processor 104. In the output video, the temporal relationship (intervals t1 and t2) between the three input regions (A, B and C) is substantially preserved between the output video frames (A1, B1 and C1).

Various formats of output data representative of video motion may be produced in response to the user's indications of regions in the static image. The output data may be converted to video substantially simultaneously with the user's indications around the static image. The video may be generated therefrom and displayed in real time substantially simultaneously with the user's indications. This provides essentially a real time virtual rostrum camera effect to accompany the user's discussion of the still image. Alternatively the video output may be saved for subsequent video generation.

Since a video may be produced from a single static digital image and a sequence of rendering instructions, substantially less data is used than would be the case if a corresponding digital video were created consisting of many separate video frames. Hence the memory, storage capacity and data transmission requirements for the video may all be reduced.

The output data may be a streamed video data file, for example but not limited to an audio video interleave (AVI), .wmv, or .mpg file, to enable the video to be reproduced without custom software on many computers. The file may also include audio (e.g. the narration given by the creator on the features of the static image).

Alternatively, to reduce the file size, the output data may comprise the static digital image and a sequence of video rendering instructions corresponding to the user's indications, possibly as separate image and control files. The instructions essentially comprise, for each video frame, the position of the frame with respect to the static image, and the extent of the image to be reproduced in the video frame (i.e. effectively the size of the frame with respect to the static image). Audio data may also accompany the image data. A set of video rendering instructions and/or the static image may also accompany a streamed video data file, to enable subsequent editing.

The output video data may be structured into sections corresponding to the featured image regions.

A modified video reproduction technique may be used to advantage before an audience. This involves generating, in advance of the presentation, video data by verbally discussing the features of the static image and indicating the regions of interest, producing a video tour of the image. The verbal narration is also recorded and stored with the video data. When giving the presentation, the video is shown to the audience, but the narration is provided live by the speaker. The recorded audio may be played discretely to the speaker, e.g. via an earpiece or headphones, to serve as a prompt or template for the speaker. During the presentation, the video reproduction system may monitor the speaker's spoken words using speech recognition, and the video content may be modified accordingly. For example, if the speaker omits a feature of the image from his discussion, then the video will not zoom in on it.

A video tour of an image may be generated semi-automatically by having a user talk about the image while pointing directly to regions of interest in it. This is a natural and intuitive method for noting specific regions of interest of an image for virtual rostrum camera operations with several advantages:

(a) it delivers more psychologically valid regions of interest than can be extracted automatically;
(b) it delivers sequential information about the order in which to visit a series of locations;
(c) it provides continuous timing information which can be used to pace virtual rostrum camera movements between locations;
(d) it can capture the user's interpretation and comments on the image for presentation with the video; and
(e) it gives a rationale for each camera movement—namely to direct the viewer's attention to, and increase the clarity of, what is being spoken about.

Producing Audio-Photos from Static Digital Images

In an alternative embodiment, the system 25 of FIG. 3 may be configured to produce audio-photos from the static digital images. Instead of panning or zooming a virtual rostrum camera to regions of a static digital image selected by a user, the static digital image may be cropped to a region indicated by the user, and audio (e.g. explanatory speech relating to that region) may be recorded and stored to accompany the cropped image. Examples of methods by which a user may indicate a region of interest have been described above.

A cropped image with accompanying audio will be referred to as an audio-photo. Given that many people are likely to talk about a digital photograph during its lifetime, this facility therefore provides an effective way of generating an album of audio-photos, cropped from various regions of an original image, with each having accompanying audio. An album of audio-photos from a single image essentially represents the history of the photograph, providing a record of users' interactions and comments on the photograph over a period of time.

Audio-photos may be generated from a given digital image in a variety of ways, examples of which are:

1. A cropped digital photograph may be generated as a separate image file from the original image, and the accompanying audio may be stored as part of the data file of the cropped image. Thus the audio-photo is self-contained.
2. A cropped digital photograph may be generated as a separate image file from the original image, and the accompanying audio may be stored in a data file separate from but associated with that of the cropped image.
3. A cropped digital photograph may be specified as being a certain region of the original image file (i.e. specifying the position and extent of the cropped image within the original), and the accompanying audio may be stored as part of the data file of the original image.
4. A cropped digital photograph may be specified as being a certain region of the original image file (i.e. specifying the position and extent of the cropped image within the original), and the accompanying audio may be stored in a data file separate from but associated with that of the original image.

The third and fourth options above advantageously enable an entire album of cropped images to be generated using a single image file accompanied by a series of instructions specifying the regions of the original image (as indicated by users) that are to form the content of the cropped images. Thus, the total amount of data used (and hence the corresponding memory and storage requirements) to generate the series of cropped images (not including the audio) will not be substantially greater than for the original image. For example, an album of 20 cropped images may readily be generated from a single image and 20 cropping instructions. The audio data corresponding to each cropped image may be stored with each cropping instruction, or in a separate but associated data file.

The invention claimed is:

1. A method of producing video data from a static digital image, comprising:
   receiving input from a user indicating sequentially, in real time, a plurality of regions of the static digital image;
   processing, by a processor, the user input to determine the visual content of each of a sequence of video frames; and
   generating, by the processor, output data representative of the sequence of video frames;
   wherein the sequence and composition of the video frames are determined such that:
     the visual content of the video frames is taken from the static digital image;
     for each region of the static digital image indicated by the user, a video frame is composed such that the region occupies a substantial part of the video frame; and
     the sequence of video frames shows the regions indicated by the user in sequential correspondence with the sequence in which the user indicated the regions and substantially in pace with the time in which the user indicated the regions.

2. The method as claimed in claim 1, wherein the output data comprises a sequence of instructions specifying the position of video frames with respect to the static digital image.

3. The method as claimed in claim 2, further comprising applying said sequence of instructions to the static digital image to generate video data.

4. The method as claimed in claim 1, wherein the output data comprises a stream of video data.

5. The method as claimed in claim 4, wherein the video data is generated in real time.

6. The method as claimed in claim 5, further comprising showing the video substantially in real time with receiving the user's input.

7. The method as claimed in claim 1, wherein receiving input from the user further comprises displaying the static digital image and receiving data representative of the user's manual movements relative to the image.

8. The method as claimed in claim 7, wherein receiving input from the user further comprises displaying the static image on a visual display and superimposing a movable cursor on the image, the cursor being controllable by a cursor control device operable to generate data representative of the user's manual movements.

9. The method as claimed in claim 8, wherein receiving an activation signal on the cursor control device causes the region pointed to by the cursor to be indicated.

10. The method as claimed in claim 7, wherein displaying the static digital image further comprises printing the static digital image and placing the printed static digital image on a digitizing tablet operable to detect the movement of a pointing device thereon and to generate data representative of the user's manual movements.

11. The method as claimed in claim 7, wherein displaying the static digital image further comprises displaying the static digital image on a touch sensitive device operable to detect the movement of a pointing device thereon and to generate data representative of the user's manual movements.

12. The method as claimed in claim 7, wherein receiving data further comprises using a camera directed at the image, the camera having movement processing means operable to detect the user's hand movements relative to the image and to generate data representative of the user's hand movements.

13. The method as claimed in claim 7, wherein a region is indicated by a user by pointing to a point within that region.

14. The method as claimed in claim 13, wherein the visual content of a video frame corresponding to the indicated region is determined by the processor performing visual feature analysis around the point indicated to determine the extent of the region of interest to be included in the video frame.

15. The method as claimed in claim 7, wherein a region is indicated by a user tracing a shape around that region.

16. The method as claimed in claim 15, wherein the visual content of a video frame corresponding to the indicated region is determined by the processor plotting a video frame within the traced shape and optimizing the size of the video frame relative to the static digital image so as to include as much of the traced shape as possible.

17. The method as claimed in claim 15, wherein the visual content of a video frame corresponding to the indicated region is determined by the processor plotting a video frame outside the traced shape, so as to include substantially all of the traced shape.

18. The method as claimed in claim 1, wherein the process of receiving input from the user comprises:
   using a microphone to receive speech from the user on the subject of the static digital image;
   using speech processing means to analyze the content of the speech; and
   using image processing means to locate the regions in the static image relating to the speech content to thereby produce data representative of the indicated regions.

19. The method as claimed in claim 18 for use in giving a video presentation, wherein the sequence of video frames shown to an audience is determined in real time in correspondence with regions related to the speech content of a narrator during the video presentation.

20. The method as claimed in claim 1, wherein the sequence of video frames is determined so as to give the effect of panning and zooming between the regions indicated by the user.

21. The method as claimed in claim 20, wherein the sequence of video frames comprises key video frames corresponding to the regions indicated by the user, and intermediate video frames corresponding to regions between those indicated by the user.

22. The method as claimed in claim 1, further comprising recording audio narration contemporaneously with receiving the user's input.

23. The method as claimed in claim 22, wherein the output data further comprises the audio narration.

24. The method as claimed in claim 23, further comprising saving the output data for subsequent audiovisual reproduction.

25. The method as claimed in claim 24, further comprising showing the sequence of video frames and replaying the audio narration.

26. The method as claimed in claim 25 for use in giving a video presentation, wherein the sequence of video frames is shown to an audience and the audio narration is replayed to a narrator via an earpiece to act as a prompt for live verbal narration by the narrator.

27. The method as claimed in claim 24, further comprising displaying the static digital image, receiving input from a user selecting a region of the static image, and reproducing the audio narration corresponding to that region.

28. The method as claimed in claim 27, further comprising reproducing the video corresponding to the selected region.

29. The method as claimed in claim 1, wherein receiving input from the user comprises
receiving narrative input from a user.

30. A non-transitory computer-readable storage medium containing a computer program that when executed by the processor implements the method as claimed in claim 1.

* * * * *